Jan. 6, 1942. J. M. OATES Re. 21,996

DOWEL MEANS FOR ROADWAY JOINTS

Original Filed Feb. 23, 1938 2 Sheets-Sheet 1

Inventor

J. M. Oates,

By D. P. Wolhaupter

Attorney

Jan. 6, 1942. J. M. OATES Re. 21,996

DOWEL MEANS FOR ROADWAY JOINTS

Original Filed Feb. 23, 1938 2 Sheets-Sheet 2

Inventor

J. M. Oates,

D. P. Wolhaupter

Attorney

Reissued Jan. 6, 1942

Re. 21,996

UNITED STATES PATENT OFFICE 21,996

DOWEL MEANS FOR ROADWAY JOINTS

James M. Oates, Ashland, Va.

Original No. 2,164,590, dated July 4, 1939, Serial No. 192,149, February 23, 1938. Application for reissue March 12, 1941, Serial No. 383,027

9 Claims. (Cl. 94—18)

This invention relates to roadway joints and more particularly to a novel dowel construction for effectively connecting adjacent slabs of a concrete roadway, particularly at the location of the expansion or contraction joints.

According to the prevailing practice it is customary to provide dowel bars embedded in the road slabs in such a way as to prevent the heaving or lifting of one slab of the roadway relative to the other, either from extreme temperature variations, or under heavy rolling loads, or from changing sub-grade conditions. In many cases the accepted practice is to provide round dowel bars of approximately three-fourths inch in diameter and approximately twenty-four inches long usually located on twelve inch centers across the roadway, with one end of the dowels bonded into one of the concrete slabs while the opposite end, extending through the joint, is provided with a tubular sleeve or is coated with bituminous or other material to prevent bonding of the concrete thereto so that movement of the dowel in one of the slabs is permitted as a consequence of expansion and contraction of the slab under extreme temperature conditions. The practice set forth as to the diameter, length and spacing of the dowels is generally recognized as being the minimum which will provide a sufficient area of metal to obtain the desired reinforcing effect, having due regard to cost, but, as will be readily appreciated bars of greater area may be used.

When joints are prepared at the factory to receive dowels proper lateral spacing thereof may be rendered mathematically accurate, but even though the dowels are spaced correctly in the joint, or joint material, it is necessary to provide means for keeping the dowels properly alined both horizontally and vertically and also preventing the joint from tilting or canting out of proper position during installation and pouring of the concrete. While numerous stakes and other supports have ordinarily been used, nevertheless, in many cases, if a workman should inadvertently step on one or more of the supports the dowel becomes cocked and the joint is likely to be canted or tilted which means either additional time in placing it back in proper condition, or, on the other hand, if the defect passes unnoticed, the particular joint cannot efficiently perform its intended functions.

Road building is a highly competitive field, and aside from labor costs another and important factor is the weight of material and consequent cost. In other words, since dowels and their installing devices are usually made of metals which have a relatively fixed tonnage or fabricating cost any improvement which will give better strength and better results with lighter or less material is an extremely important factor in roadway construction.

Having in view the foregoing general considerations the present invention has primarily in view a novel construction which effects economy in time and labor and at the same time provides a light construction which gives greater strength and better results than heavier constructions within a competive range, while also affording more adequate support for the dowels and joints to insure against accidental displacement. These important factors center about a novel dowel which provides greater resistance to shearing stresses between the roadway slabs, and provides greater bearing area, while at the same time utilizing less material and permitting of assembling a series of dowels in such a way that they may be readily adapted to the particular joint material so as in effect to provide a complete unit whose parts may be prefabricated in the shop according to precision standards, and later accurately assembled to be laid across the roadway at the proper place by unskilled labor. In that connection, the invention contemplates a structure which is so constructed as to be properly braced and thus self-sustaining with the joint material with the least possible number of anchoring stakes or other devices while at the same time all of the structure involved remains in the concrete to give added strength and reinforcement to the slabs where it is most needed.

Another and more specific object of the invention is to provide a novel dowel which in its general sense may be described as being of U-shaped formation, the said dowel being formed of stock of comparatively small diameter or cross sectional area, and which because of its particular shape and disposition or mounting in the slabs provides a definitely greater percentage of shear strength and bearing area than a straight dowel bar of larger diameter and cross sectional area. As a consequence of the disposition and use of the dowel proposed herein it is also possible to use a fewer number of dowel elements across the roadway. That is to say, instead of having the dowels positioned on twelve inch centers, as in the case of straight round dowels, it is entirely possible to place dowels of the present construction on approximately sixteen inch centers thus reducing the number of dowels to each expansion joint.

A further object of the invention is to provide novel supporting means for the dowels so that they may be properly assembled in the factory or shop and which will retain them in the desired position and arrangement until installation is complete.

With the above and other objects in view which will more readily appear as the nature of the invention is better understood the same consists in the novel construction, combination and arrangement of parts hereinafter more fully described, illustrated and claimed.

A preferred and practical embodiment of the invention is shown in the accompanying drawings in which.

Similar reference characters designate corresponding parts throughout the several figures of the drawings.

In its general aspect the present invention includes, in combination, a suitable expansion or contraction joint or joint material designated generally as A, the novel dowel units B, and their sub-grade supporting means designated generally as C, all of which constitute a complete assembly adapted to be placed across the roadway, at the joint location, for embedment in adjacent slabs.

Figure 2:
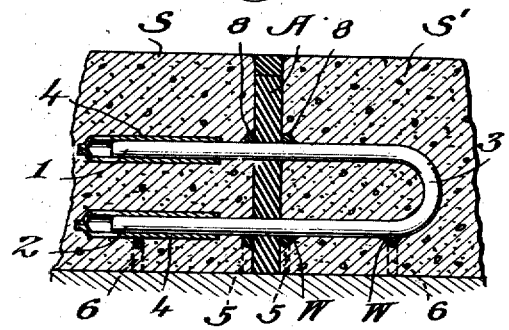
Figure 2 is a vertical sectional view through a completed roadway joint showing the manner in which the dowels may be embedded in the slabs.

The distinctive feature of the invention resides in the dowel bars B which, as previously indicated, are of substantially U-shaped formation. This description is intended to refer to any type of dowel which is formed to provide a plurality of members or arms 1 and 2 connected by a relatively transverse member 3 or its equivalent, the arms 1 and 2 being preferably of the same length, or at least of such a length as to pass or extend through the joint A whereby the dowel may be embedded in the opposite road slabs S and S1 as shown in Figure 2.

Referring more particularly to the dowel units B, it may be pointed out that the same are preferably formed of round stock of approximately five-eighths of an inch in diameter and approximately twenty-one inches in length with a total weight of 1.825 pounds whereas it is customary to use straight dowels of three-fourths inch in diameter and twenty-four inches in length, with a weight of three pounds. In any event, the diameter of the stock from which the dowels are made can be considerably less than the stock of which a single straight dowel is made. In addition, the total length of the dowel including the arms and legs 1 and 2 and the connecting portion 3 may be substantially the same length or of less length than the length of the ordinary straight dowel. However, when a dowel of smaller diameter than a straight dowel is formed in the manner proposed herein the relative length of embedment of the dowel in opposite slabs is considerably less than the length of embedment of a straight round or equivalent dowel for the reason that the distribution of the dowel arms in the slabs provides a more satisfactory distribution of reinforcing material which will give up to approximately 38% greater shearing strength and 66% greater bearing area with 39% less weight, than a straight dowel of larger diameter. In other words, it will be apparent that even though the dowel stock is smaller in diameter and of less weight than that of a given single straight dowel, because two arms or legs of the dowel are embedded in the concrete, the total cross-sectional area of both legs or arms is greater than a single straight dowel of greater diameter and hence greater sectional and bearing area is provided with less material.

In use, the adjacent dowel units B are assembled on opposite supports or chairs C so that their transverse portions 3 are arranged in staggered relation throughout the length of the joint. In other words, the relative position of adjacent dowels is reversed, and the transverse portion 3 of one dowel is firmly anchored in one slab while the transverse portion of the adjacent dowel is firmly anchored in the opposite slab.

In all cases the arms or members 1 and 2 of the dowel are free to move relative to the slab in which they are embedded. This is accomplished by coating the free ends of the arms with suitable bituminous or other material to prevent bonding of the concrete thereto, and by using tubular sleeves or boots which surround the free ends of the dowel arms 1 and 2 and provide a definite pocket in which the free ends of the dowels may move. Accordingly, as will be observed from the drawings the free ends of the dowels are fitted with the tubular metallic or equivalent sleeves 4 which may be closed at one end, by pinching, to insure that none of the plastic concrete will enter the end of the tube opposite that telescopically fitting over the ends of the arms 1 and 2.

In practice, the sleeves 4 are not permanently tied or connected in any way to the supports or chairs C but are loosely fitted to the legs or arms 1 and 2 of the dowels. However, the dowels themselves are definitely and accurately connected and spaced laterally and vertically by the elements which form the chair means C prior to assembly with the joint A. That is to say, the portions of the dowel units B approaching their closed ends are supported by tie-elements in the form of spaced rods 5 and 6 each provided with the upwardly converging arm portions 5*a* and 6*a* which are preferably slightly depressed to form seats 7 for receiving the bottom arm of the dowel to permit of being welded thereto as indicated at W. In addition, the chair means C preferably includes the upper tie rod 8 which lies substantially in the same vertical plane as the lower tie rod 5 and is welded as indicated at W′ to the tops of the upper arms of the dowel units. The supporting means or chairs as above described are, of course, common to opposite sides of the joint unit because the adjacent dowels are reversed as to position. The rods 5, 6 and 8 are preferably of relatively small diameter, for example, five-sixteenths of an inch and are, therefore, comparatively light but contribute generally to the scheme of producing a light but strong joint construction while holding the dowels in horizontal and vertical alinement.

Figure 1:
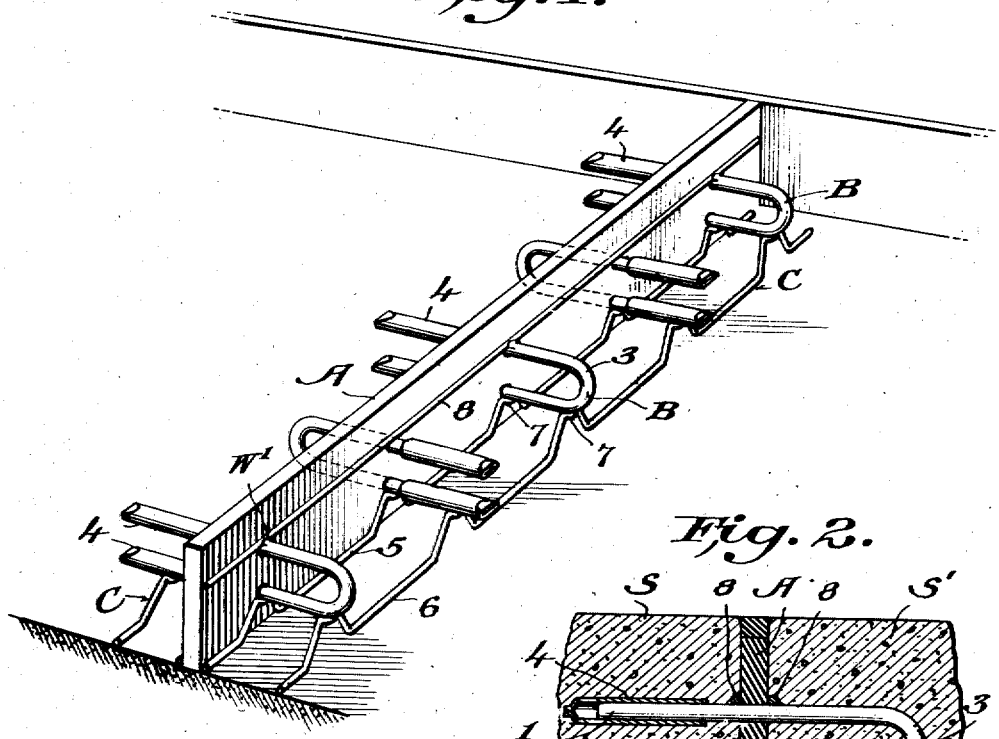
Figure 1 is a perspective view of a roadway joint embodying the improved dowel means.
Figure 3:
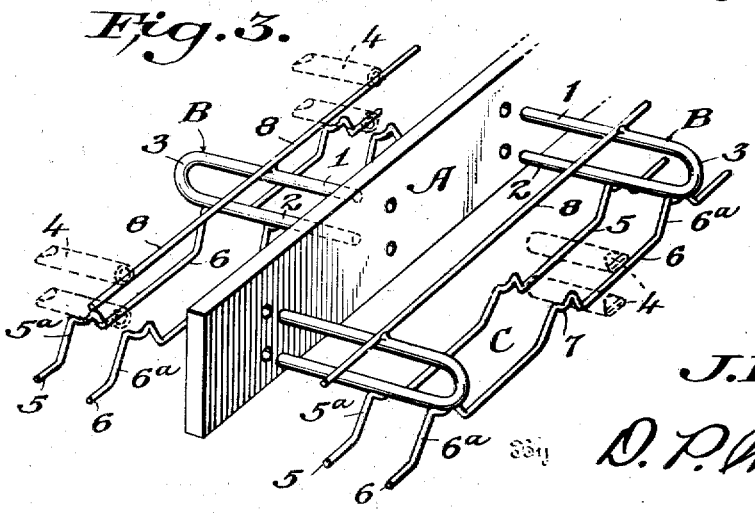
Figure 3 is a perspective view of the complemental dowel-chair units prior to assembly with the joint material.

As will be apparent from Figure 3 alternate dowels may be assembled with a supporting chair C in such a way as to pass through the joint A from opposite sides, assuming that the joint has been previously provided with suitable openings to admit the arms 1 and 2 of the dowel. When the construction is assembled as shown in Figure 1 it may be laid across the roadway as a complete unit, and it will of course be understood that the dowel is interlocked with the joint so that it cannot twist or rock axially, but the supports or chairs perform the important function of insuring that the dowels do not tilt vertically or shift laterally endwise relative to the joint A. It will also be apparent that in assembling the dowels to the joint, the rods 5 and 8 in each case parallel the joint and act as stops or abutments to limit movement of the dowels toward the joint.

The foregoing description is generic to all forms of the invention. However, it will be apparent from an inspection of Figures 1–3, inclusive, that the one way of mounting the dowel units B is to arrange them vertically of the road slab so that the arm 1 is nearest the surface of the slab while the arm 2 is positioned near the bottom. However, Figures 4–6, inclusive, of the drawings illustrate the application of the invention wherein the dowel units are positioned horizontally. In this case, however, the said dowel units have the same features and characteristics set forth in connection with the dowels shown in Figures 1–3, inclusive.

Figure 4:
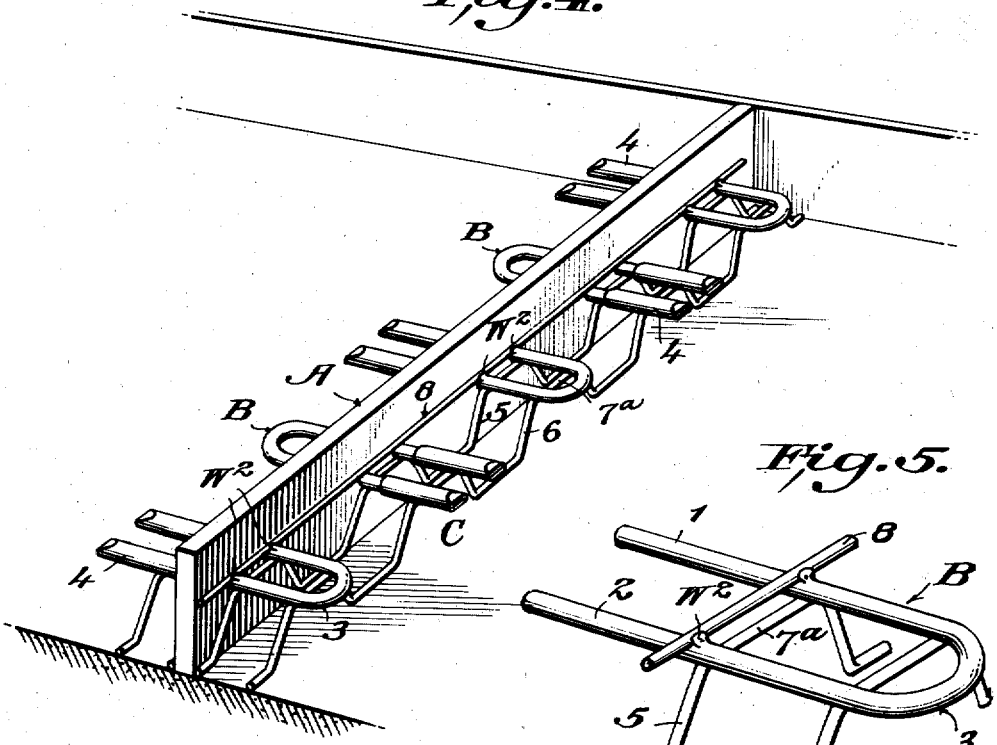
Figure 4 is a perspective view illustrating a modified arrangement of the dowel units showing that they may be disposed horizontally instead of vertically in the roadway.
Figure 5:
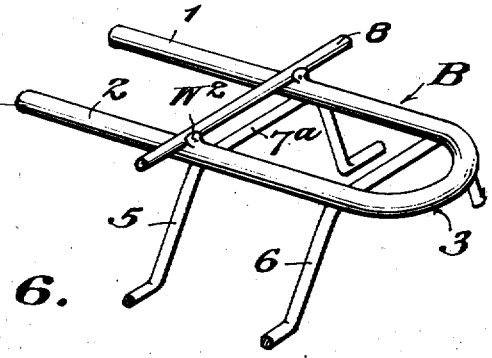
Figure 5 is an enlarged perspective view of a portion of one of the dowel units shown in Figure 4.
Figure 6:
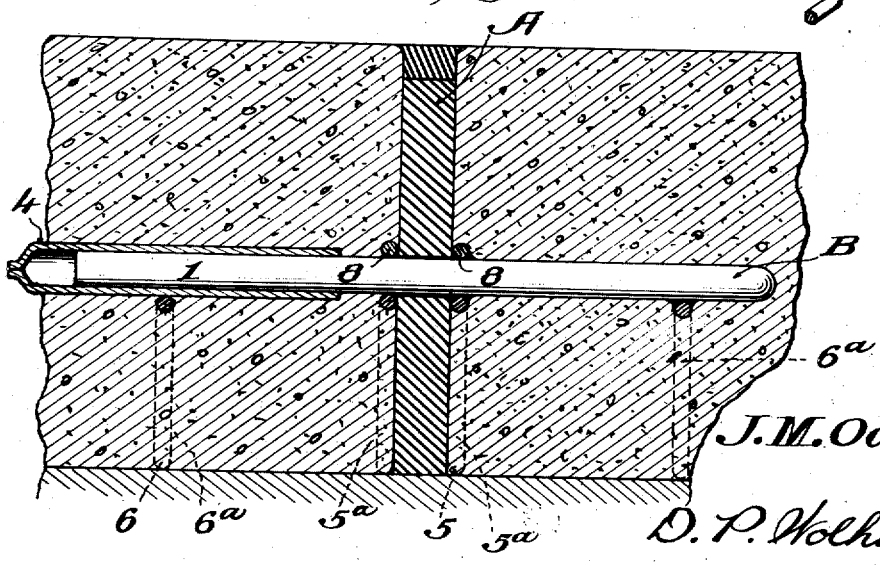
Figure 6 is a vertical sectional view of a completed joint embodying the dowel means arranged as in Figure 4.

As will be observed from Figures 4–6, inclusive, the dowel units B are arranged in alternately, staggered relation, the same as in Figure 1, but, due to the fact that the units are horizontally arranged, the chair means C is modified to the extent that the seating portion 7*a* of the rods 5 and 6 is made longer to accommodate and support both arms of the unit instead of one arm as in the construction shown in Figures 1–3. The chair means C in Figure 4 contains the same essential tie rods as shown in Figure 1, and the top tie rod 8 in the construction of Figure 4–6 has a welded connection W2 with one or both of the legs 1 and 2 of the dowel units.

While, in the illustrations, the dowels are shown as being arranged in alternately staggered relation, nevertheless, it is within the scope of the invention to arrange all of the dowels so that their closed ends are located at the same side of the joint, and likewise all of the free ends will be arranged at the opposite side of the joint.

From the foregoing it will be apparent that the fundamental feature of the invention resides in providing a novel multi-arm or double prong dowel unit which essentially comprises a pair of spaced arms free at one end to pierce the joint material and span the joint so that the free and connected ends respectively of the dowel arms may be embedded in the adjacent concrete slabs thereby materially increasing the bearing area of each unit in the slabs, and also obtaining greater resistance to shearing forces while at the same time using lighter dowel stock and consequently less material. It will be apparent from the disclosure that the arms or members 1 and 2 of each unit B are spaced closer together than the units B themselves. And, because of the greater shearing strength provided it will be possible to use a fewer number of dowel units which effects added economy. Moreover, the adjacent ends of the slab will be more effectively held against movement so that relative movement between the dowel and the material of the slab itself is prevented with the consequence that breaking down of the concrete material at the dowel locations is avoided.

I claim:

1. Means for connecting the slabs of roadways at joint locations including a double arm dowel both arms of which pierce the joint material and span the joint, and a plurality of tie members crossing said dowel at points spaced lengthwise thereof and supporting the dowel on the sub-grade.

2. A dowel construction for roadway joints comprising spaced two-arm dowel members both arms of which pierce the joint material and span the joint, and means for supporting said members in rigid relation in vertical and transverse planes, said means comprising continuous members arranged substantially at right angles to and spaced lengthwise of the dowel and formed to provide lower portions engaging the sub-grade and upper portions having the dowel members secured thereto.

3. Means for connecting roadway slabs at joint locations including units each comprising a pair of dowel members arranged in spaced horizontal relation in the material forming the joint, the space between the members being less than the space between the units, and spaced tie elements for non-tiltingly supporting said members on the sub-grade.

4. Means for connecting roadway slabs at joint locations including units each comprising a body having integral dowel members arranged in spaced horizontal relation in the material forming the joint, the space between the members being less than the space between the units, and means for supporting the said members on the sub-grade including tie elements spaced longitudinally of the members and secured thereto, said tie elements having downwardly extending sub-grade engaging portions.

5. A dowel construction for roadway joints comprising a plurality of road slab interlocking units each comprising a dowel of U-shaped formation presenting free and closed ends, adjacent units having the free ends of the dowels passing through the joint from opposite sides thereof, and means for supporting said units against horizontal or vertical displacement, said means including spaced tie rods having portions resting on the sub-grade and other portions connected to the arms of the dowels at the side of the joint where said closed ends of the dowels are located.

6. A dowel construction for roadway joints comprising, a plurality of road slab interengaging units each comprising a dowel of U-shaped formation having arms whose free ends pass through the joint from opposite sides thereof, and means for supporting the dowels at opposite sides of the joint, said means at each side comprising spaced continuous rods having lower portions adapted to rest on the sub-grade and upper portions engaging the dowels and welded thereto, and a rod connecting alternate dowels at the same side of the joint.

7. Dowel and chair assembly for the expansion and contraction joints between poured concrete slabs comprising a series of dowels arranged in spaced parallel relation, and chair means comprising a pair of continuous members of substantial depth dimension arranged in spaced planes perpendicular to the axes of the dowels, and formed to provide lower portions to engage the subgrade and upper portions supporting the dowels, each dowel having a linear anchor portion adjacent one end adapted to be permanently fixed in the concrete of one of the joint-forming slabs, said continuous members both being rigidly secured to the anchor portions of each of said dowels, the other ends of said dowels extending beyond the chair means a substantial distance and adapted to be slidably imbedded in the adjacent slabs.

8. Dowel and chair assembly for the expansion and contraction joints between poured concrete slabs comprising a pair of chair members each including a rod bent to form a series of upwardly extending loops with their bights at dowel-supporting height, alternating with a series of downwardly extending loops with their bights engageable with the subgrade, said chair members being positioned in spaced parallel planes with their loops in the same phase, and a series of dowels each having a linear anchor portion adjacent one end adapted to be permanently fixed in the concrete of one of the joint-forming slabs, supported by said supporting bights perpendicular to the planes of said chair members, both of said chair members being rigidly secured to the anchor portions of each of said dowels, the other ends of said dowels extending beyond the chair means a substantial distance and adapted to be slidably imbedded in the adjacent slab.

9. Dowel and chair assembly for the expansion and contraction joints between poured concrete slabs comprising a pair of chair members each including a rod bent to form a series of upwardly extending loops with their bights at dowel-supporting height, alternating with a series of downwardly extending loops with their bights engageable with the subgrade, said chair members being positioned in spaced parallel planes with their loops in the same phase, a series of dowels each having a linear anchor portion adjacent one end adapted to be permanently fixed in the concrete of one of the joint-forming slabs, supported by said supporting bights perpendicular to the planes of said chair members, both of said chair members being rigidly secured to the anchor portions of each of said dowels, and a tie rod substantially in the plane of said dowels bridging the spaces between said dowel-supporting bights and so secured as to fix the length of said spaces, the other ends of said dowels extending beyond the chair means a substantial distance and adapted to be slidably imbedded in the adjacent slab.

JAMES M. OATES.